2,839,918

FLAW DETECTION

Robert C. Switzer, South Euclid, Ohio

No Drawing. Application April 6, 1949
Serial No. 85,749

2 Claims. (Cl. 73—104)

This invention relates to improved methods and agents for locating surface discontinuities or flaws in test bodies. My United States Patent No. 2,259,400 discloses methods of detecting subsurface flaws in substantially solid bodies comprising the steps of applying to the surface of the test body a luminescent testing agent which will penetrate the surface openings of subsurface flaws, removing the portion of the luminescent testing agent remaining on the surface of the body by solvent cleaning or particle blasting, and then inspecting the surface of the body in darkness and under fluorescigenous radiation for the portion of the testing agent which had penetrated into the surface openings of the subsurface flaws and which reappears as a luminous indicator of the flaw location. This invention, more particularly relates to an improvement in my foregoing method and to improved testing agents.

My aforesaid method has been a particularly successful non-destructive testing method for locating surface discontinuities, in small articles, such as blow-holes and the like in cast bodies, and fatigue cracks, grinding cracks and the like in finished bodies. An especial advantage of the aforesaid method is that the composition of the test bodies generally has no effect on the efficacy of the method. The method has been employed successfully for locating surface discontinuities in non-metallic bodies as well as in both magnetic and non-magnetic metallic bodies.

Several problems have arisen in the production testing by my aforesaid method, particularly of large and heavy articles. First, very fine cracks are penetrated very slowly by the testing agents, and, after penetrating, the testing agent will reappear at or on the surface very slowly. Second, testing agents which will penetrate fine cracks will also have great surface wetting properties and are, consequently, difficult to remove from the surface of the bodies being tested so that false indications will not be obtained. Third, in order to remove such thorough penetrating agents without affecting or destroying the finished surface of the body, suitable solvents or the like may be employed, but such solvents are usually expensive and large quantities must often be employed. Fourth, many large castings and like bulky articles are not readily transported to locations which may be darkened as required for inspection by the aforesaid Switzer method; such heavy bodies are also handled with considerable difficulty during the inspection procedure once the location is satisfactorily darkened. Fifth, the sources of the required fluorescigenous radiations, almost exclusively high intensity mercury vapor arcs, are relatively expensive special equipment. Sixth, some operators required to inspect test bodies continuously under such sources complain of the undesirable effect of continued eyeball fluorescence. Seventh, in some applications the method is too sensitive; the result in such cases has been over-inspection and excessive rejection by inexperienced operators.

It is the object of this invention to overcome the foregoing problems. Specifically, it is an object of this invention to provide a method or procedure which will accelerate the penetration of the testing agent into the flaws, accelerate the removal of the testing agent from the surface of the body, speed the reappearance on the surface of the body of the testing agent retained in the flaws and eliminate the necessity for darkened inspection locations and complex sources of fluorescigenous radiations. It is another object of this invention to provide a suitable testing agent which will rapidly penetrate the openings of fine flaws but which may be rapidly and thoroughly removed from the surface of the test body by inexpensive agents without being removed from the flaws in the test body. These objects are accomplished by heating the test body, cooling the test body in a water-emulsifiable testing agent having intense visible color, washing the testing agent from the test body, reheating the test body and/or applying an absorbent for the testing agent to the surface of the cleaned test body. The test body is then inspected in daylight or under artificial visible lighting conditions normally maintained for inspection lines.

Admittedly, this improved method of testing does not have the ultimate sensitivity of the testing method disclosed in my aforesaid patent. By testing according to this invention, however, one may obtain under daylight inspection conditions very rapid results which satisfy most practical standards, particularly in the inspection of heavy or clumsy articles. Any additional steps required by this invention are generally more than offset by its suitability to rapid production testing of articles in which the finest flaws are not cause for rejection.

Other objects and advantages of this invention will be apparent from the following detailed specification and the claims.

In general, the method of testing according to this invention comprises five preferred steps which may be carried out in several different ways. The five preferred steps are: first, heating the test body; second, cooling the test body while at least the portion of the surface to be tested is covered with a flaw-penetrating testing agent having intense, visible color and which is also preferably, but not necessarily, water-emulsifiable; third, removing the portion of the testing agent remaining on the surface of the body, as by flushing the body with water when the preferred water-emulsifiable agent is used; fourth, driving or drawing on or to the surface of the body a portion of the testing agent retained in the flaws; and fifth, inspecting the test body under suitable visible lighting conditions which will reveal the location and extent of flaws by the contrast between the intensely colored stains and the body surfaces. Specific examples of each of the steps are given below, but it is to be understood that the following examples are given by way of illustration and are not to be considered as limitations.

The body to be tested is preferably cleaned prior to heating. If the test body is a machined and finished metal part, for example, the suitable temperature to which it is heated can usually range between 90° and 160° C. Several factors must be taken into account to determine the maximum temperature to which the test body is to be heated, such as, for example, the physical deformation and stresses caused by heating; the effect on the temper of the body of the heating and subsequent cooling; the baking or carbonization, on the surface and in the flaws of the body, of residual films of cutting oil and the like; the oxidation of the surface of the body; and the dissociation, volatilization, and flash point of the testing agent which may be applied to the heated body. The test body can usually be heated quickly by soaking it in a vat of boiling water, although superheated steam, ovens, infra-red radiation, induced electric currents, hot solvents which may remove surface films, or other equivalent means, may be employed where expedient. When the test body is very large or unwieldy, localized areas, rather than the whole body, may be heated. If the body is heated with a liquid, it is often preferable to dry the body by superheated steam, hot air, or simply allowing the heat of the body to vaporize the liquid after removing the body from the heating liquid and before applying the testing agent.

The test body is then allowed to cool while the portion of the surface to be tested is covered with the testing agent. This is usually accomplished by simply immersing the heated test body in a bath of the testing agent maintained at approximately room temperature. While being cooled in the bath of the testing agent, the testing agent quickly penetrates the surface openings of the flaws. By the time the test body has been cooled to approximately room temperature, the testing agent will usually have penetrated all detectable flaws, although the time the test body is allowed to remain in the bath of the testing agent may depend upon the penetrating ability of the testing agent and the degree of fineness of the flaws desired to be revealed. As pointed out above, a preferred testing agent is a water-emulsifiable liquid having intense visible color and capable of penetrating the flaws to be revealed. Specific examples of suitable emulsifiable testing agents are given below.

After the test body has been immersed in the testing agent, the body is removed from the bath and excess testing agent is allowed to drain off. The testing agent remaining on the surface of the body is then washed off with wash water. To wash off the testing agent, the body may be simply sloshed in a vat or subjected to streams or sprays of wash water. If streams or sprays are employed, it is preferable that they should be no more forceful than necessary to wash the testing agent off the surface of the test body. The washed test body is then drained of wash water and may be dried by streams of warm air to evaporate wash water. Other procedures may be employed to remove excess wash water, such as by wiping the test bodies with absorbent cloths or by preferentially wetting the surface with another liquid according to the disclosure of the copending application of Taber de Forest for Wet Developer, Serial No. 563,798, filed November 16, 1944, now abandoned.

The cleaning methods employed in each case will depend largely upon the composition of the product as well as the finish desired. Rough castings may be readily cleaned by impact with shot in the orthodox shot-blasting machines which utilize air or centrifugal force to throw a continuous stream of shot; other products may be cleaned by abrasion with sand-blasting equipment or tumbling mills; and still other products may require solvent cleaning, air cleaning, wiping, brushing, etc. If the composition of the product is such that it will be corroded or otherwise injured by the use of water to clean the article, or if the article is cleaned by removing the surface upon which the applied testing agent remains, then it is frequently desirable to employ the non-self-emulsifying testing agents as described in the section under the heading "Non-emulsification techniques" rather than the self-emulsifying testing agents as described in the section under the heading "Emulsifying techniques."

After the testing agent has been washed or otherwise removed from the surface of the test body, a portion of the testing agent which penetrated the surface openings of the subsurface flaws in the body is forced or drawn to or on the surface of the body. In many instances sufficiently accurate results are obtained by either heating the body or by applying on the surface of the body a fine light-reflecting agent, termed a "developer," which apparently absorbs the testing agent by capillary attraction. Generally both an absorptive agent and heat are employed although in some instances an actual color-forming or color-contrast-enhancing chemical reaction may take place between the testing agent and the developer. A satisfactory light-reflecting absorptive agent is French talc, applied in either a dry, finely powdered state or as a thin suspension. Other satisfactory developers are disclosed in the above-identified application of Taber de Forest and, if the developer is one which preferentially wets the test body, the steps of removing wash water and developing may be conducted simultaneously. Developers in liquid form may be applied by immersion, brushing or spraying, whereas the application of powdered developers may entail blowing, dusting, tumbling, and the like.

Treated articles are normally inspected under a viewing condition so designed and controlled in each specific case as to cause maximum color contrast between the body surfaces and the particular extraneous substance used as a testing agent and retained in and about or seeping from the surface outlet of the flaws. If articles in one instance are treated with penetrating oils saturated with highly-colored dyestuffs, subsequent inspection in daylight is usually preferable, although illumination from combination mercury arc and tungsten filament light sources as commonly used in inspection work, for example, will also serve. If test bodies are treated with agents chosen because of their distinctive and characteristic response to monochromatic light, such monochromatic light, carefully controlled as to intensity and direction of incidence, should be used to the exclusion of other light in the final inspection of the test bodies so treated, and it has been found that colored gelatine light filters in combination with common light sources will provide monochromatic light practically in some cases. Also, light-sensitive means other than the human eye, such as a photographic camera or a photo-electric cell, may be employed to respond to the contrast between the testing agent and the adjacent surface of the test body.

NON-EMULSIFICATION TECHNIQUES

One simplified technique within the scope of this invention comprises treatment with solutions consisting of penetrating oils colored with oil-soluble dyestuffs. Mineral oils, diesel oils, transformer oils, commercial penetrating oils, kerosene, and the like may be used as vehicles for the dyestuffs. Satisfactory results may often be obtained by rapid dipping or simple coating, but complete immersion is usually recommended to insure penetration of minute tears, cracks, and other small cavities. Pressure tanks may be used and the pressure of the treating solution raised within practical limits by pumps to increase the penetration rate, depth of penetration, and amount of agent forced into the cavities.

Bodies so treated are next cleaned and subsequently inspected in daylight at any reasonable time following cleaning. The location of flaws is revealed by colored stains, for the highly colored oil seeps from the flaws to stain the surfaces immediately adjacent, sometimes leaving recrystallized dyestuff virtually "piled" around the surface openings of flaws. The "bleeding" or seeping of oil from flaws may be hastened if necessary by heating the cleaned articles or by striking them with sharp hammer blows, but oil stains of sufficient size generally result when cleaned articles are allowed to stand for a period of time before final inspection.

The dyestuff used in the above procedure should have excellent staining properties when in solution and should produce stains which contrast with and are readily detectable against the particular surface under inspection. It has been found that alpha-naphthalene-azo-alpha-naphthol solutions, for example, leave brown stains, benzene-azo-benzene-azo-beta-naphthol produces red stains, benzene-azo-resorcinol produced yellow stains, xylene-azo-beta-naphthol leaves orange stains, while o-toluene-azo-o-toluene-azo-beta-naphthol produces purple stains.

Many common dyestuffs, carried in such solvents as high boiling point alcohols, have also been used. In some instances, however, it has been found advantageous to first treat test bodies with such solutions, clean them, and then dip them in a secondary coating solution which dries on their surfaces, absorbs and "fixes" the dyestuff retained in and about the flaw openings, and which often forms a white or light-colored background upon which the colored lines and spots produced by the absorbed dyestuff are readily detectable in daylight. Pigmented white shellac paints, white water color paints, etc., serve very well as secondary coating materials.

Further, it has been found that heat-sensitive salts, carried into flaws and developed with heat may be useful in detecting flaws. Thus, the application of mild heat to metallic bodies treated with a solution of cobaltous chloride, for example, and subsequently cleaned, produces a distinctive blue stain in the proximity of flaw outlets. Inspection in this case will usually be carried out in daylight or in light from combination mercury-arc and incandescent sources.

Detection of flaws in test bodies through the use of a plurality of agents may be well exemplified by a procedure comprising, firstly, the application of a primary chemical solution in a manner similar to that described above, secondly, the removal of the agent from the external body surfaces, and, thirdly, treatment of the body with a secondary chemical solution which produces a colored reaction product in the proximity of the surface apertures of the flaws upon interaction with the primary agent retained in or seeping from the flaws. Thus, the reaction of a ferrous salt with potassium ferricyanide to form Prussian blue may be utilized in locating flaws, in which case the ferrous salt, as primary agent, may be carried into the flaws in a vehicle consisting of dextrine and glycerine. Development of the ferrous salt remaining in the locality of the flaws after subsequent cleaning is then accomplished by immersing the metallic body in a dilute solution of potassium ferricyanide. A blue reaction product results from this development, but if ammonium sulfo-cyanate is substituted for the potassium ferricyanide as developer, a brilliant red product is formed.

In like manner, a permanent brown stain may be produced about the surface apertures of flaws by first treating the test body with a solution of tannic or gallotannic acid in a carrier such as dextrine and glycerine, and after cleaning the body, dipping it into a developer solution containing ferrous sulfate. This procedure may be reversed, i. e., the ferrous sulfate may be carried into the flaws as primary agent, in which case the acid solution will serve as developer. Detection of the brown stains produced by such techniques is readily effected in daylight or artificial daylight.

EMULSIFICATION TECHNIQUE

The preferred testing agents of this invention, however, exhibit several essential characteristics, namely, intense color, excellent penetrating and surface wetting properties, and water-emulsifiability. The unique characteristic of the preferred testing agents is that of water-emulsifiability. It has been discovered that this characteristic allows the testing agent to be washed off the surface of the test body without being appreciably washed out of the flaw openings. The preferred characteristics are usually obtained by compounding the testing agent of a penetrant, a coloring material, preferably oil-soluble, and an emulsifying agent which renders the testing agent water-emulsifiable. The penetrant is preferably a water-insoluble oil or like liquid; it may be a single petroleum or hydrocarbon fraction or a number of them proportioned to give the penetrant good metal wetting characteristics, low surface tension, low volatility, suitable viscosity, and proper solvent power for the other constituents. The coloring material is an ingredient foreign, i. e., added, to the other ingredients of the testing agent; it is selected to provide the most distinctive contrast with the color of the surface of the particular body to be tested, giving due consideration to the effect of the developer which may be used. The emulsifying agent is usually composed of one or more oil-soluble soaps, detergents, or other surface-tension reducing agents which render the testing agent "self-emulsifying," that is, the testing agent will emulsify directly in water; in some instances it may be expedient to employ soaps or detergents which are not in themselves oil-soluble but which may be held in solution by a mutual solvent or coupling agent (often in alcohol) for the actual emulsifier and the oil; for the purposes of this invention, such mutual solvents or coupling agents may simply be considered a part of the emulsifying agent. It is not always essential to incorporate the emulsifying agent in the testing agent. Instead, the emulsifying agent may be incorporated in the wash water; in such instances, the testing agent may, for the purposes of this invention, be considered "emulsifiable" but not "self-emulsifying."

In formulating a specific testing agent, numerous variables must be considered. In selecting a specific penetrant to be employed, one should select a penetrant which will thoroughly wet the surface of the specific type of article to be tested. For example, penetrants which are excellent for metal may be less satisfactory for plastics and ceramics. The type of discontinuity likely to be found is also a factor in selecting a proper penetrant. If the flaws are likely to be blowholes, shrinkage cracks, or similar flaws having relatively large volumes and open surface openings such as may be found in cast metal articles, one may often use a penetrant which does not have the extremely thorough wetting properties and low viscosity necessary in a penetrant used for locating discontinuities having relatively closed surface openings such as grinding cracks, forging bursts, and the like. In selecting an emulsifying agent, one should avoid those which tend to form scums or sludges with the penetrant selected. The concentration of emulsifying agent is dependent not only upon the efficacy of the specific agent but also upon the type of discontinuity likely to be found. If the flaws are likely to be shallow, the testing agent should be removable from exterior body surfaces by a very gentle washing; if the flaws are likely to be deep and with relatively closed surface openings, the concentration of emulsifying agent may be decreased to permit complete emulsification to be obtained with the aid of sprays exerting a strong scrubbing action.

From the foregoing it is apparent that in the testing agents, the proportions of penetrant and emulsifying agent may vary widely. In any given case the proportions will depend upon the requirements of the articles to be tested and the properties of the specific ingredients, but in general the concentration of penetrant may vary upwardly from approximately fifty percent by weight, the concentration of emulsifying agent may vary up to approximately fifty percent by weight, and the concentration of coloring material may vary up to approximately ten percent by weight.

Illustrative but not limitative examples of suitable emulsifiable testing agents are as follows:

Example 1

| | Percent by weight |
|---|---|
| 1. Straight-run petroleum distillate, 300° F. fire point | 83 |
| 2. Ortho-toluene-azo-ortho-toluene-azo-beta-naphthol | 0.3 |
| 3. Naphthenic acid soap (molecular weight about 350) | 16.7 |

Example 2

| | Percent by weight |
|---|---|
| 1. Kerosene | 77.6 |
| 2. Benzene-azo-benzene-azo-beta-naphthol | 0.4 |
| 3. Octylaminoethanol soap of tetradecyl sulfuric acid | 22 |

Example 3
| | Percent by weight |
|---|---|
| 1. Kerosene | 54 |
| "Texaco" penetrating oil | 37 |
| 2. Tri (diethylene glycol ether) of sorbitol trioleate | 2 |
| 3. Benzene-azo-resorcinol | 7 |

Example 4
| | Percent by weight |
|---|---|
| 1. Kerosene | 49 |
| 2. Xylene-azo-beta-naphthol | 1 |
| 3. Sodium salt of mahogany acid | 50 |

Example 5
| | Percent by weight |
|---|---|
| 1. Kerosene | 53 |
| 2. Commercial Malachite Green | 2 |
| 3. Sodium dodecyl benzenesulphonate | 18 |
| Cyclohexanol | 27 |

In this example, the cyclohexanol serves as a mutual solvent for the penetrant, kerosene, and the emulsifying agent, sodium dodecyl benzene-sulphonate. The cyclohexanol may, therefore, be considered part of the emulsifying agent.

Example 6
| | Percent by weight |
|---|---|
| 1. "Texaco" penetrating oil | 67.3 |
| Ethylene glycol monobutyl ether | 16 |
| 2. Benzene-azo-benzene-azo-beta-naphthol | 0.7 |
| 3. Naphthenic acid soap | 16 |

In this example ethylene glycol monobutyl ether serves to maintain the coloring material in solution in the penetrant and may, therefore, be considered either part of the penetrant or part of the color. In this connection, it should also be pointed out that many colors as sold commercially are dissolved in diluent vehicles. The concentration of active color in any of the foregoing examples is stated on the basis of a pure color undiluted by impurities or commercial diluent vehicles.

Example 7
| | Percent by weight |
|---|---|
| 1. Kerosene | 73.5 |
| S. A. E. 50 motor oil | 22 |
| 2. Alpha-naphthalene-azo-alpha-naphthol | 1.5 |
| 3. Refined sulphonated aromatic petroleum fractions (approximate empirical formula: $C_{26}H_{25}SO_3Na$; approximate molecular weight: 430) | 3 |

When inspecting test bodies according to the above described methods, it is often desirable to inspect the test body while the testing agent is being drawn or forced out of the flaws in order to obtain a qualitative as well as a quantitative analysis of the flaws. Thus, for example, where the testing agent first appears as a thin colored line and then widens without diminishing in tinctorial strength, a narrow deep crack will be indicated; where the testing agent appears as a comparatively wide line and then diminishes in strength as the line widens, a wide and shallow crack is indicated.

It is also to be understood that this invention, particularly with respect to the testing agent, is not to be limited to the embodiments disclosed, which were given by way of example, but that this invention may be modified and varied by those skilled in the art. For example, whereas the foregoing examples of testing agents show the use of oil-soluble dyes as the coloring material, it is to be understood that, in suitable instances, one may employ in suitable concentrations (usually higher than the concentrations shown for dyes) dyes laked on suitable oil-soluble substrata, such as oil-soluble soaps, or dyes laked on very finely divided oil-insoluble substrata capable of being extremely thoroughly dispersed in a penetrant; indeed, very fine pigments, such as the nigrosines or the Lithol reds, may be suitably dispersed in a penetrant, as by grinding. Accordingly, in the following claims, the term "color material," where used, is a generic term for dyes, lakes, or pigments capable of extremely fine subdivision in penetrants. It is also to be understood that the term "color," as used in this specification and in the following claims, may include black and white. The limitations of this invention, therefore, are not set forth in the foregoing specification but in the following claims.

This application is a continuation-in-part of my joint application with Richard A. Ward for "Detection of Flaws," Serial No. 606,708, filed July 23, 1945 now abandoned, a copending application with said Ward's application for "Method of Locating Surface Discontinuities," Serial No. 531,648, filed April 18, 1944 (now United States Patent No. 2,405,078, granted July 30, 1946), and its copending application for a "Method of Locating Surface Discontinuities," Serial No. 446,820, filed June 12, 1942 (allowed to become abandoned in favor of said application Serial No. 531,648).

What is claimed is:

1. In a method of detecting the presence of flaws in the surface layers of a metallic article, the steps comprising applying to the surface of said article a solution containing an oil and a coloring material, maintaining the solution in contact with the surface for a period of time of sufficient duration that the solution may penetrate said flaws, removing from the surface the solution which has not penetrated said flaws, and applying to the surface a finely divided absorbent material, the presence of flaws in the surface layers of said metallic article being visibly indicated by a coloring of the absorbent material lying adjacent said flaws by the coloring material contained in the solution upon the seeping of the latter out of said flaws onto the surface of the article.

2. In a method of detecting the presence of flaws in the surface layers of a metallic article, the steps comprising applying to the surface of said article a solution containing a penetrating oil and an oil soluble dye, maintaining the solution in contact with the surface for a period of several minutes, removing the solution which is present on the surface, and applying to the surface a finely divided absorbent material the color of which contrasts with the color of the dye, the presence of flaws in the surface layers of said metallic article being visibly indicated by a coloring of the absorbent material lying adjacent said flaws by the dye contained in the solution upon the seeping of the latter out of said flaws onto the surface of the article.

References Cited in the file of this patent

UNITED STATES PATENTS

| 2,259,400 | Switzer | Oct. 14, 1941 |
| 2,405,078 | Ward | July 30, 1946 |
| 2,478,951 | Stokley | Aug. 16, 1949 |

FOREIGN PATENTS

| 50,147 | France | Dec. 13, 1939 |
| | (1st addition to No. 822,308) | |
| 224,242 | Switzerland | Feb. 1, 1943 |
| 436,873 | Great Britain | Oct. 21, 1935 |